United States Patent
Negishi

[19]

[11] Patent Number: 5,974,330
[45] Date of Patent: *Oct. 26, 1999

[54] PORTABLE TELEPHONE WITH CURRENT LOCATION DISPLAY AND NETWORK THEREOF

[75] Inventor: Yoichi Negishi, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,686

[22] Filed: Dec. 4, 1996

[30] Foreign Application Priority Data

Dec. 6, 1995 [JP] Japan .................. P07-344802

[51] Int. Cl.$^6$ ................................. H04B 7/26
[52] U.S. Cl. ................. 455/457; 455/33.1; 455/456
[58] Field of Search ................... 455/457, 456, 455/433, 566, 422, 33.1, 38.4, 54.1; 342/457

[56] References Cited

U.S. PATENT DOCUMENTS

| | | |
|---|---|---|
| 5,384,834 | 1/1995 | Sato et al. .................. 379/88 |
| 5,502,758 | 3/1996 | Tsuzuki ..................... 455/457 |
| 5,592,154 | 1/1997 | Lin et al. .............. 340/825.5 |
| 5,613,202 | 3/1997 | Ishida et al. ............ 455/33.1 |
| 5,613,232 | 3/1997 | Toshida et al. ........ 455/226.4 |
| 5,621,785 | 4/1997 | Norimatsu ................ 455/433 |
| 5,625,668 | 4/1997 | Loomis et al. ............. 379/58 |
| 5,627,547 | 5/1997 | Ramaswamy et al. ....... 342/357 |
| 5,629,710 | 5/1997 | Sawada .................. 342/457 |
| 5,736,964 | 4/1998 | Ghosh et al. ............. 342/457 |
| 5,740,538 | 4/1998 | Joyce et al. ............. 455/456 |

*Primary Examiner*—Wellington Chin
*Assistant Examiner*—Pablo N. Tran
*Attorney, Agent, or Firm*—Jay H. Maioli

[57] ABSTRACT

A microcellular portable telephone displays one's location, data on the location of the base station and, a data table showing the interrelation between the base station identifier code and base station location data. Pressing a specified operating key converts the base station identifier code connected to the portable telephone into data on the location of the base station by referring to the data table. The location of the base station is shown on the display device by means of the converted data.

9 Claims, 4 Drawing Sheets

| OUTDOOR PUBLIC TELEPHONE EXTENSION IDENTIFIER CODE | ADDRESS (EQUIPMENT SITE) |
|---|---|
| 001·············01 | SHINAGAWA-KU KITA SHINAGAWA 6-7-35 |
| ... | ... |
|  |  |

DTBL DATA TABLE

34 LCD

CS-ID IDENTIFIER CODE

PORTABLE TELEPHONE WITH CURRENT LOCATION DISPLAY AND NETWORK THEREOF

BACKGROUND OF THE INVENTION

This invention relates to a portable telephone.

In a microcellular portable telephone system such as the PHS (Personal Handyphone System) which is one of radio communication standards of Japan, a large overall calling area can be structured by arranging a plurality of small calling areas (cells). In the United States of America, PCS (Personal Communication System) has been used as the similar system.

More specifically, as for instance in FIG. 6, a calling area also referred to as a radio zone Z11, is comprised of a base station CS11, and the radio zones Z12 through Z1N are respectively comprised of the base stations CS12 to CS1N. In this case, the radius of zones Z12 through Z1N varies according to factors such as the surrounding conditions. However, this radius is generally, for example, about 100 meters and a maximum of about 400 meters.

The radio zones Z11 through Z1N are fundamentally established in proximity to each other and these zones Z11 through Z1N comprise the calling area also referred to as a position registration area A1.

Further, the radio zones Z21 through Z2M are comprised of the base stations CS21 through CS2M, and the position registration area A2 is comprised of these zones Z21 through Z2M. Hereafter a plurality of position registration areas (not shown in the drawing) are comprised in the same way. In this case, the position registration areas are generally located in proximity to each other to comprise a larger calling area overall. Though not shown in the drawing, the base stations CS11 through CS1N, CS21 through CS2N, and so on are linked to city telephone switching equipment and the data base station (PHS control station).

As shown for instance in the position ① of FIG. 6, when the PHS terminal 1 is within the zone Z11 and the power is turned on, the terminal 1 sends a position registration request to the base station CS11, and the data base station registers the information that the terminal 1 is in the zone Z11. The terminal 1 is also notified from the base station CS11 with an identifier code CS-ID of the base station CS11.

However, as shown in the position ② of FIG. 6, with power on at the terminal 1, when the terminal 1 moves from the zone Z11 to zone Z12, an adjacent zone in the same position registration area A1, the terminal 1 is this time notified from the base station CS12 with an identifier code CS-ID of the base station CS12.

Further, as shown in the position ③ of FIG. 6, with power on at the terminal 1, if the terminal 1 moves from zone Z11 to Z21 and into another position registration area A2, this time the terminal 1 makes a position registration request to base station CS21. The information that the terminal 1 is in the zone Z21 is registered in the data base station. The base station CS21 sends an identifier code CS-ID to the terminal 1 from the base station CS21.

In this way, even if the position of the terminal 1 changes, its position can be monitored by the data base stations by means of the individual position registration areas. The terminal 1 is of course, able to therefore send out messages and also to receive messages.

FIG. 5 shows the format for the identifier code CS-ID sent from a base station to the terminal 1. The first nine bits of the identifier code CS-ID indicate the identifier code of the business using PHS, and the following 33 bits indicate the outdoor public telephone extension identifier code for specifying the base station.

This outdoor public telephone extension identifier is comprised of a total call-up area number for specifying the position registration areas A1, A2 and so on, and an extension identifier code for specifying the radio zone according to the position registration area.

The terminal 1 therefore knows the individual base station to which it is to be or has been connected.

SUMMARY OF THE INVENTION

This invention is intended to render microcellular type portable telephone systems configured as described above with additional value not previously available in the terminal 1.

In other words, by utilizing the facts following:

(1) The radio zones Z11 through Z1N, Z21 through Z2M, and so on is generally a microcell with a radius of as small as, for example, about 100 meters and, (2) The terminal 1 can identify an area by the base station, in other words by means of the individual radio zone, the object of the invention is therefore to arrange for the terminal 1 user to be able to easily know his own location.

To accomplish the purpose of the invention, in a microcellular telecommunication system comprising a portable telephone having a display and base stations in which the location of the portable telephone is monitored by a data base station through a base station while the portable telephone is within the area of the base station, and the base station identifier code is recognized by the portable telephone wherein the portable telephone determines information for showing the identifier code of the base station corresponding to the location data of the base station and the location data of the base station corresponding to the received identifier code of the base station, and displays the location on the display based on the determined location data.

In a microcellular telecommunication system comprising a portable telephone having a display and an operation key for communicating to the base station and base stations in which the location of the portable telephone is monitored by a data base station through a base station while the portable telephone is within the area of the base station, and the base station identifier code is recognized by the portable telephone wherein;

the data base station linked to the base station has data for showing the interrelation between the location of the base station and the base station identifier code and, so that when the operation key is used with the result that the portable telephone is communicated to the base station, the location data of the base station is generated correspondingly from the base station identifier code which station is communicating to the portable telephone, the portable telephone receives the location data, and the address is displayed on the display based on the received data showing the address of the base station.

Accordingly, one's location is shown on the terminal display when the specified operation key is pressed.

DETAILED DESCRIPTION OF THE PREFERRED EMBODIMENTS

Figure 1:
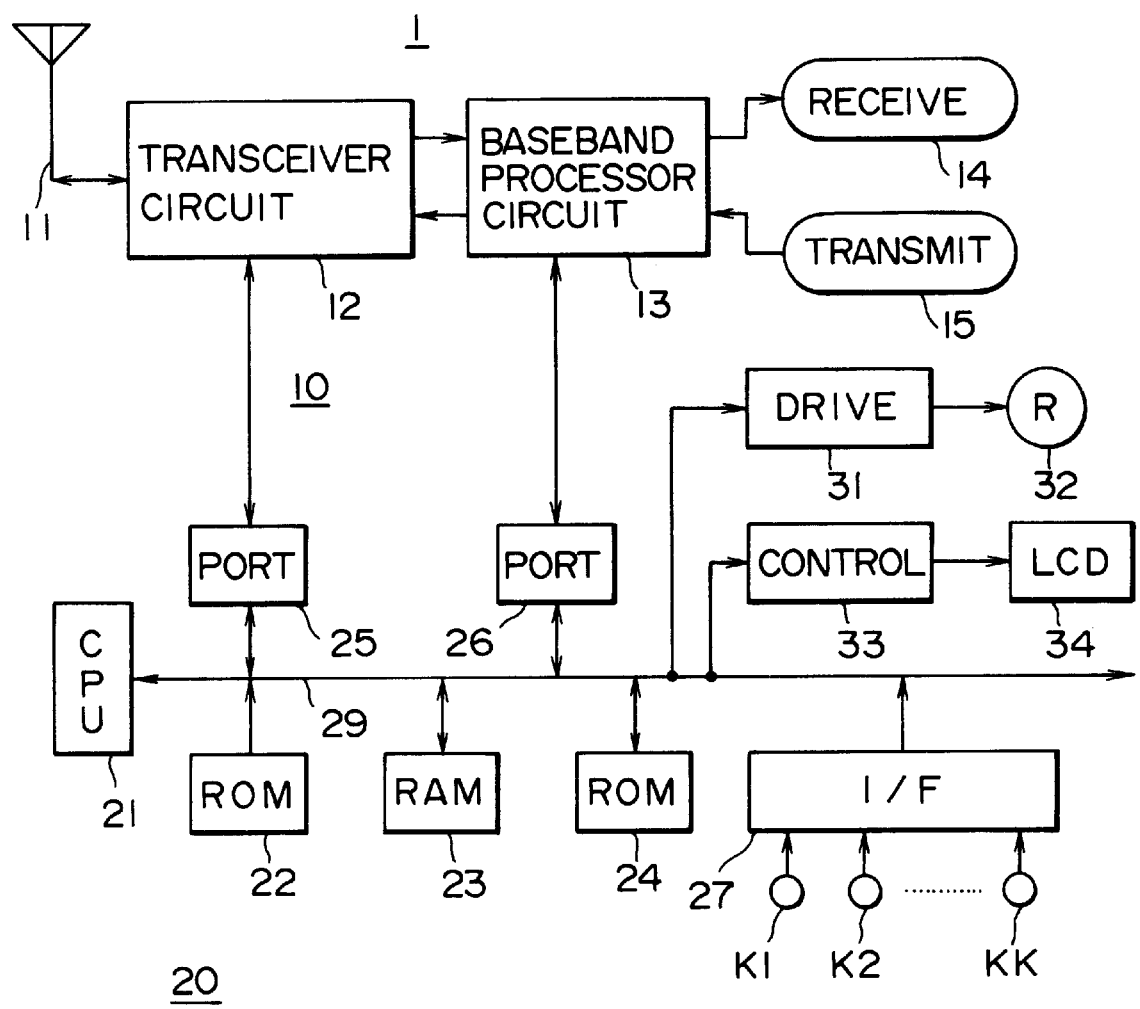
FIG. 1 is a system block diagram showing one configuration of the invention.

Reference number 1 in FIG. 1 shows a PHS terminal. This terminal 1 is comprised of an audio signal circuit 10 for telephone calls and a microcomputer 20 for system control.

This audio signal circuit 10 has a transceiver antenna 11, a transceiver circuit 12, a baseband processor circuit 13, a telephone receiver 14 and a telephone microphone 15. The baseband processor circuit 13 performs transmit signal processing such as D/A conversion and time axis compression (PPI) of the audio signal from the telephone microphone 15. The audio signal thus processed, is supplied to the transceiver circuit 12 and changed to a high frequency signal. This signal is transmitted to the base station from the antenna 11.

The high frequency signal from the base station is received by the antenna 11, signal processing is A performed in the baseband processor circuit 13 complementing the processing during signal transmission, to restore the other party's audio signal, and this audio signal is then supplied to the telephone receiver 14.

Further, data needed for connection to the base station is accessed between the base station and the microcomputer 20 by way of the transceiver circuit 12 and the baseband processor 13.

The microcomputer 20 contains a CPU 21, a ROM 22 in which are written various subroutines, a work area RAM 23 and a data ROM 24. These memories 22 through 24 are connected to the CPU 21 by way of the system bus 29.

Figures 2, 3:
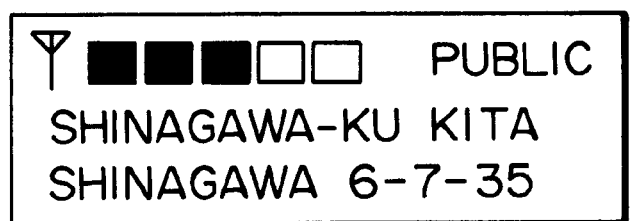
FIG. 2 shows one configuration of the data table.
FIG. 3 is a sample of the display.

In this case, the ROM 24 has for example, as shown in FIG. 2, character data showing the base station site (address) and a data table DTBL showing the interrelation of the outdoor public telephone extension identifier ID code CS-ID assigned to the base station. If character data showing the base station site, and the public telephone extension ID codes together comprise a set requiring a size of 200 bits, then about 40,000 base stations are needed to cover Tokyo area in Japan, so the ROM 24 should have a capacity of 1 Mbyte.

The ports 25 and 26 as well as the interface circuit 27 are connected to the system bus 29. The transceiver circuit 12 is controlled by way of the port 25 and data is accessed by way of the baseband processor 13 and the port 26. The various operation keys K1 through K7 such as the call key and the dial keys are connected to the interface circuit 27.

The ringer 32 is connected to the bus 29 by way of the drive circuit 31, and the display device, for instance LCD 34 is connected to the bus 29 by way of the display controller 33. When data is supplied to this data controller 33, this data is written into the internal memory (not shown in drawing) of the controller 33, read out at specified periods. This read out data is converted to display data and supplied to the LCD 34. This LCD 34 then displays characters (including numbers and symbols) corresponding to the data supplied from the controller 33.

This kind of configuration allows functions such as transmit, receive and calling on the terminal 1, to be performed in the same way as with a typical PHS terminal. Also as described previously, when the terminal 1 is inside a valid radio zone, an identifier code CS-ID that corresponds to this radio zone is sent from the base station and stored inside the RAM 23 so that this base station can be identified.

So when the specified key from among operation keys K1 to KK is used while the terminal 1 is for instance in standby receive, the outdoor public telephone extension identifier ID code is extracted from the identifier codes CS-ID stored in the RAM 23. By referring to the data table DTBL, this outdoor public telephone extension identifier ID code is then converted to character data displaying the address of the base station matching this identifier code. The character data thus obtained is supplied to the controller 33.

Therefore, as shown for example in the LCD 34 in FIG. 3, a row of characters is displayed that corresponds to the character data supplied to the controller 33. In other words, the base station assigned to the radio zone where the terminal 1 user is currently in, is displayed. As stated previously, in this case the width of the radio zone is, for example, a radius of about 100 meters.

Accordingly, the holder of the terminal 1 will be within a radius of about 100 meters of the address shown on the display on the LCD 34. Restated, the location of the holder of the terminal 1 will be displayed within an error range of about 100 meters. Incidentally, the error range of a general purpose GPS navigational receiver is about 30 meters.

Also at this time, as shown in FIG. 3, the RF receive level from the base station is displayed so that the terminal user can know his approximate distance from the base station based on the RF receive level, in other words the approximate distance from the address shown on the display.

The terminal 1 user can thus know his current address by utilizing the base station identifier code CS-ID provided by the terminal 1. The structure is the same as a typical PHS terminal except for the ROM 24 for data table DTBL, so the increase in cost is small.

A further advantage is that since the terminal 1 used for telephone calls also reveals one's current location, there is no need to also possess dedicated equipment such as a GPS navigation receiver.

The business utilizing this invention will have the advantage of not needing to add or modify any special hardware or software to their present system.

Figure 4:
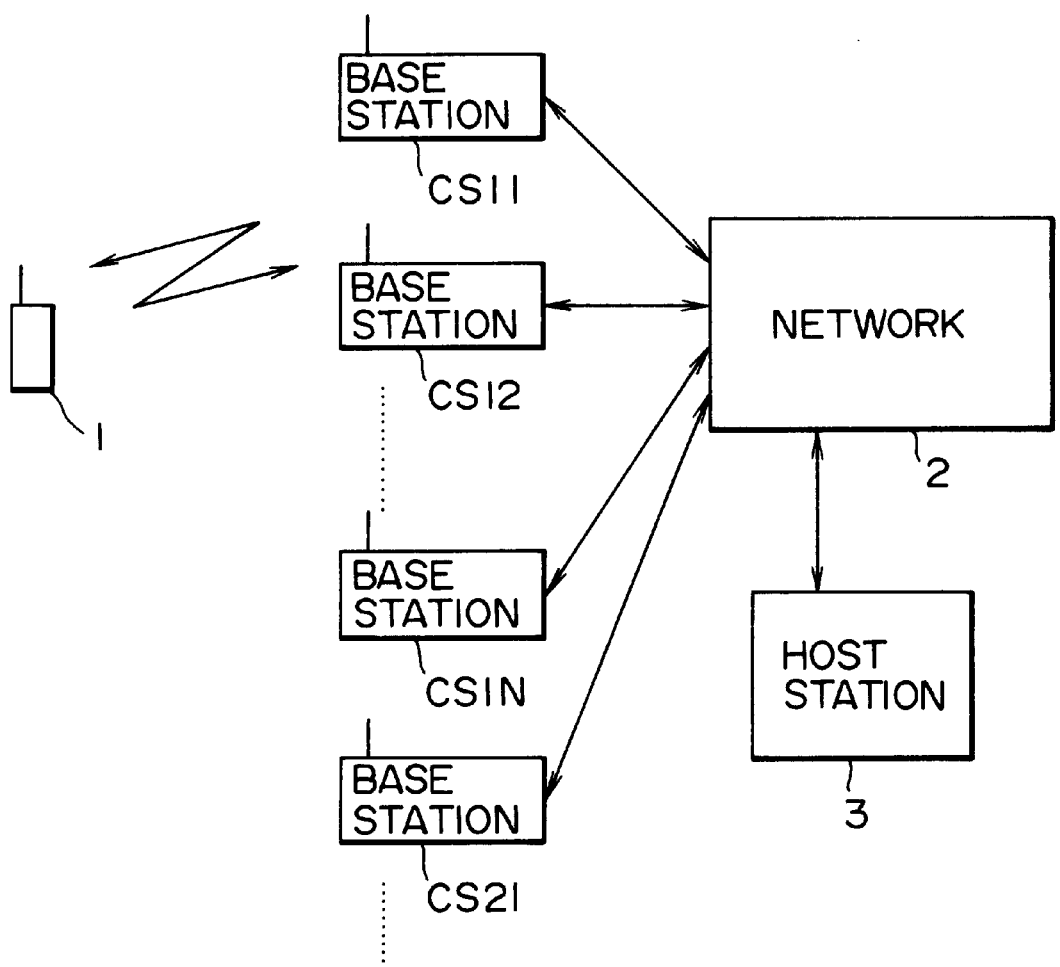
FIG. 4 is block diagram showing another configuration of this invention.
Figure 5:
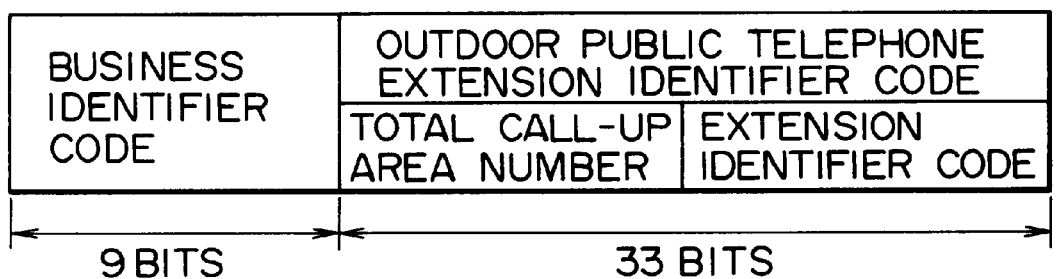
FIG. 5 is a drawing showing the signal format.
Figure 6:
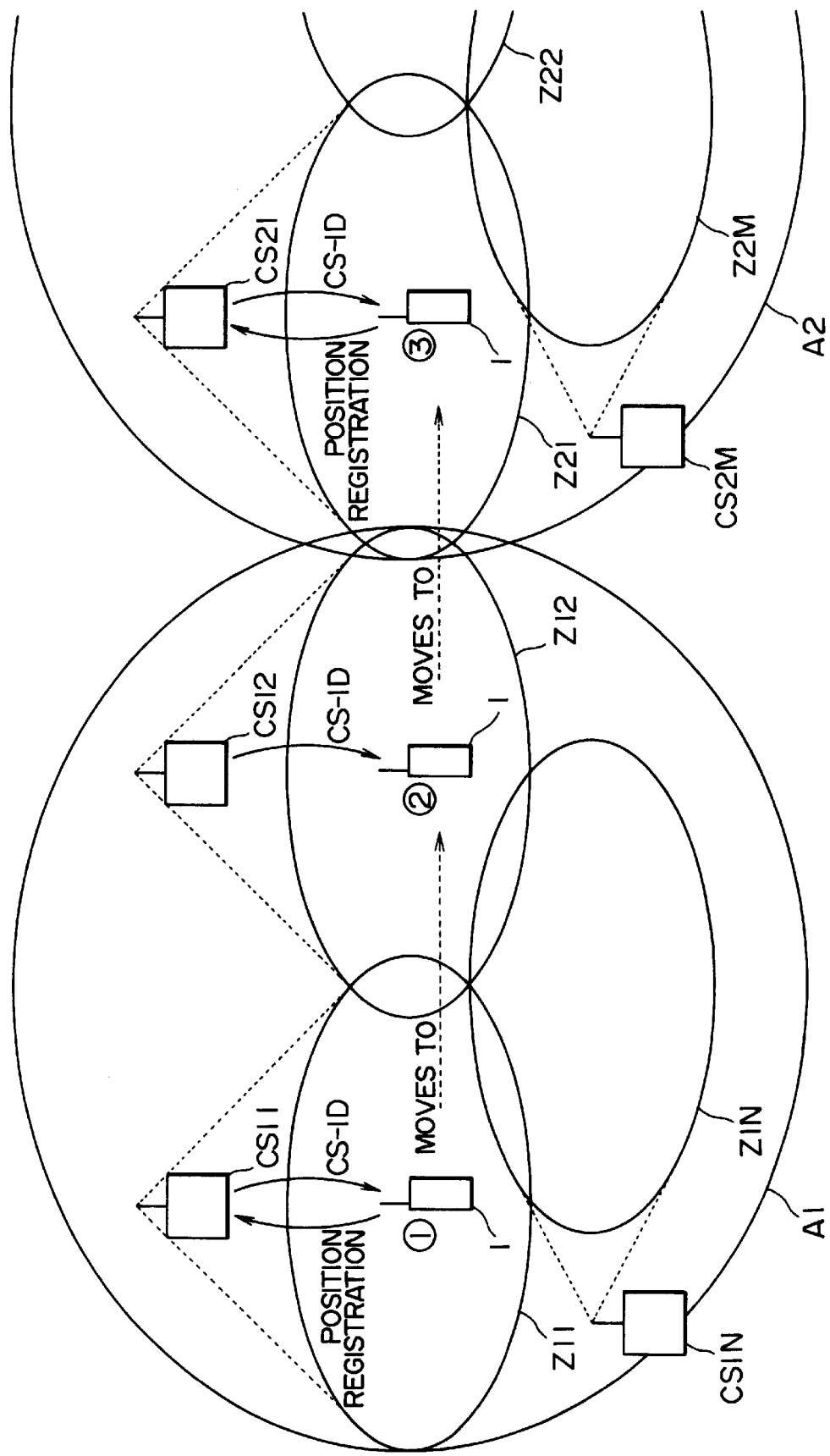
FIG. 6 is a drawing illustrating the operation of this invention.

The above described a data table DTBL that was incorporated into the terminal 1 however as shown in FIG. 4, can be accessed from the terminal 1 while located in an external location. More specifically, the base stations CS11 through CS1N, and CS21 through CS2M and so on are connected to the network 2 and though not shown in the drawing, other networks and telephone equipment are connected to this network 2.

In the case of FIG. 4, the host station (computer) is connected to the network 2 for use as a data base and the data table DTBL is provided in this host station 3. The host station 3 is assigned a particular telephone number (line number). The ROM 24 and the data table DTBL are provided in the terminal 1.

Therefore, in this type of structure when a transmission (telephone call is made) is sent to the host station 3 from the terminal 1, this call serves to connect the terminal 1 to the host station 3 by way of the base station and the network 2. When this call connection is made, the identifier code CS-ID of the outdoor public telephone extension identifier ID code of the base station to which the terminal 1 is currently connected is extracted from the RAM 23. This code is then sent to the host station 23 by way of the base station and the network 2.

The host station 3 then checks the outdoor public telephone extension identifier ID code against the data table DTBL. The address of the base station corresponding to this code is converted to character (letter) data and then sent to the terminal 1 by way of the network 2 and the base station.

The character (letter) data showing the outdoor public telephone extension identifier ID code and the base station address can then be sent by a low speed accessory control channel (data rate 3.2 kbps).

Therefore, as shown for instance in FIG. 3, a row of characters matching the character data supplied from the controller 33, is shown on the LCD 34. In other words, the address of the base station assigned to the radio zone where the terminal user is located, is shown on the display. The location of the user therefore is displayed on the terminal 1 within an error range of 100 meters.

In the case of FIG. 4, since the digital table DTBL is located outside of the terminal 1, the hardware for terminal 1 is the same as for a conventional terminal which means almost no rise in cost. Further since the data table DTBL is provided in the host station 3, storing large quantities of data is no problem. For instance data can be provided covering the entire state. Providing the data table in the host station 3 also allows data to be easily changed and the terminal 1 can obtain the latest data.

In the above description, the ROM 24 of terminal 1 can be freely detached just like a PC card and the contents of the data table DTBL of the ROM 24 can be set with data on a county by county basis.

A map can also be displayed using graphic data (map data) prepared on the data table DTBL of ROM 24 or the host station 3. For instance, a map in a range of 300 m×300 m can be displayed on LCD 34 and the corresponding base station can be positioned for display at the center of this map. When sending graphic data of the map to the terminal 1 from the host station 3, a high speed accessory channel (for example, data rate 32 kbps) can be utilized and specified sections can be enlarged on the display.

Services besides map information, such as a guide to facilities near the base station like shopping, restaurants, lodgings can be provided.

When displaying maps on the LCD 34, the display range (scale) can be changed according to the strength of the RF signal received from the host station. When this RF signal is strong an enlarged display can be shown because the base station is nearby. When this RF signal is weak, the map display could be reduced since the base station is far away.

What is claimed is:

1. A microcellular telecommunication system comprising a portable telephone having a display and base stations in which a location of said portable telephone is monitored by a data base station through a base station while said portable telephone is within the area of said base station, and a base station identifier code is recognized by said portable telephone, wherein said portable telephone includes:

means for receiving an RF signal including the base station identifier code transmitted from the base station;

means for determining information for showing said base station identifier code corresponding to location data of said base station and location data of the base station corresponding to said received base station identifier code; and means for displaying words corresponding to said location on the display based on determined location data from said means for determining and for displaying adjacent said words a level of the received RF signal so that a user of the portable telephone can know his approximate distance from the base station transmitting the RF signal.

2. The portable telephone as claimed in claim 1, further comprising a specified operation key and the location of the base station corresponding to the base station identifier code is displayed on the display in response to a key operation of the specified operation key.

3. The portable telephone as claimed in claim 1, further comprising an internal memory of said portable telephone, wherein a relation between the base station identifier code and location data is written in the internal memory of said portable telephone.

4. The portable telephone as claimed in claim 3, further comprising mounting means whereby said internal memory is freely detachable.

5. The portable telephone as claimed in claim 3, wherein data for indicating said location data are character codes indicating an address, and said address is shown as a row of characters on said display.

6. A microcellular telecommunication system comprising a portable telephone having a display and base stations in which a location of said portable telephone is monitored by a data base station through a base station while said portable telephone is within the area of said base station, and a base station identifier code is recognized by said portable telephone, wherein said portable telephone includes:

means for receiving an RF signal including the base station identifier code transmitted from the base station;

means for determining information for showing said base station identifier code corresponding to location data of said base station and location data of the base station corresponding to said received base station identifier code; and means for displaying said location on the display based on determined location data from said means for determining and for displaying a level of the received RF signal so that a user of the portable telephone can know his approximate distance from the base station transmitting the RF signal, wherein data for said location are a location map, and said location map is displayed on said display.

7. A microcellular telecommunication system comprising a portable telephone having a display and an operation key for communicating to a base station included in a plurality of base stations connected to a host station in which the location of said portable telephone is monitored by the host station through one of said plurality of base stations while said portable telephone is within an area of said one of said plurality of base stations, and a base station identifier code is recognized by said portable telephone, wherein said host station linked to said base station includes means for storing a data table for showing an interrelation between a location of said base station and said base station identifier code, whereby said digital data table is located outside of said portable telephone, so that when an operation key is used to cause said portable telephone to communicate with said base station corresponding location data of said base station is generated from data table in said host station using said base station identifier code of said base station that is communicating with said portable telephone, wherein said portable telephone receives the location data and said locating data is displayed on the display based on received data showing an address of said base station.

8. The telecommunication system as claimed in claim 7, wherein data for indicating said location data are character codes indicating an address, and said address is shown as a row of characters on said display.

9. The telecommunication system as claimed in claim 7, wherein data for said location are a location map, and said location is displayed on said display.

* * * * *